(12) United States Patent
Cruz et al.

(10) Patent No.: US 7,528,514 B2
(45) Date of Patent: May 5, 2009

(54) CENTRIFUGAL MAGNETIC CLUTCH

(75) Inventors: Ethan E. Cruz, LaGrangeville, NY (US); Timothy M. Trifilo, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 11/425,816

(22) Filed: Jun. 22, 2006

(65) Prior Publication Data

US 2007/0296295 A1    Dec. 27, 2007

(51) Int. Cl.
*H02K 49/00* (2006.01)
(52) U.S. Cl. .................. 310/103; 310/191; 310/156.16
(58) Field of Classification Search ................ 310/191, 310/209, 68 E, 156.16, 103–105
See application file for complete search history.

(56) References Cited

U.S. PATENT DOCUMENTS

| | | | |
|---|---|---|---|
| 2,745,975 A | 5/1956 | Zozulin et al. | |
| 4,152,099 A * | 5/1979 | Bingler | 417/420 |
| 4,469,220 A | 9/1984 | Becker | |
| 5,158,279 A | 10/1992 | Laffey et al. | |
| 5,691,587 A | 11/1997 | Lamb | |
| 5,711,404 A * | 1/1998 | Lee | 188/164 |
| 5,831,364 A * | 11/1998 | Buse | 310/156.28 |
| 5,909,073 A * | 6/1999 | Lamb | 310/78 |

FOREIGN PATENT DOCUMENTS

| | | | |
|---|---|---|---|
| FR | 2355205 A1 | 1/1978 | |
| FR | 2381208 A2 | 9/1978 | |
| JP | 11182585 A | 6/1999 | |
| SU | 1624222 A1 | 1/1991 | |

* cited by examiner

*Primary Examiner*—Michael C Zarroli
(74) *Attorney, Agent, or Firm*—Cantor Colburn LLP; Lily Neff

(57) ABSTRACT

A centrifugal magnetic clutch device includes, an input shaft and, a plurality of input magnets that are rotatable about an axis of the input shaft, and are radially movable relative to the input shaft axis, and are rotationally fixed to the input shaft. The device further includes, a plurality of output magnets rotatable about the input shaft axis and in axial alignment with the plurality of input magnets, and an output shaft rotationally fixed to the plurality of output magnets. The device further includes, a housing for fluidically sealing the plurality of output magnets and the output shaft relative to the plurality of input magnets and the input shaft.

8 Claims, 2 Drawing Sheets

CENTRIFUGAL MAGNETIC CLUTCH

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to centrifugal couplers and particularly to centrifugal clutches that use magnets to transfer the torque between an input shaft and an output shaft.

2. Description of Background

Centrifugal frictional clutches have been used for many years. In general torque of an input shaft is transmitted to an output shaft through the centrifugal clutch. The torque transmitted from the input to the output shaft is a function of the rotational speed of the input shaft, such that the torque transmitted increases as the speed increases. Centrifugal clutches, therefore, by design have slippage of frictionally engaged members as the speed of the output shaft is accelerated to the speed of the input shaft. This slippage of the frictional members creates wear that limits the operational life of the clutch. Additionally, the wear caused debris that can contaminate bearings and effect the operational life of the bearings as well.

Magnetic couplers are also used in the art for torque transmission between an input shaft and an output shaft. Magnetic couplers have an advantage of near infinite life since no parts are frictionally engaged during the torque transmission. Additionally, magnetic couplers allow for physical isolation between rotating parts, and are therefore commonly used in pumping applications of liquids. One example is in the pumping of cooling liquids in computers where the immersion of bearings can result in the need for frequent maintenance. Typically magnetic couplers are in full torque engagement at all times and are therefore transmitting their maximum torque at all times regardless of the speeds of the input shaft and the output shaft.

A combination of the two aforementioned concepts are combined into a magnetic centrifugal clutch, that is also known in the art and is described in detail in U.S. Pat. No. 5,691,587 (hereafter '587), included herein in its entirety by reference. By mounting the magnets to the input shaft in a radially slidable manner and biasing the magnets radially inwardly, '587 allows the magnetic centrifugal clutch to transmit substantially no torque from the input to the output shaft when the rotational velocity of the input shaft is low. A low torque transmission during start up of the input shaft is desirable when a sensorless brushless direct current (SBLDC) motor drives the input shaft. This is due to the fact that SBLDC motors posses very little starting torque. However, the magnetic centrifugal clutch of '587 prohibits the fluidic isolation of the input shaft from the output shaft. For pump applications this is problematic since bearings and seals are common sources of leaks.

Accordingly, there is a need in the art for a clutch that transmits a variable torque from an input shaft to an output shaft and simultaneously permits the input shaft to be fluidically sealed relative to the output shaft.

SUMMARY OF THE INVENTION

Further shortcomings of the prior art are overcome and additional advantages are provided through the provision of a centrifugal magnetic clutch device. The device comprising, an input shaft, a plurality of input magnets rotatable about an axis of the input shaft, radially movable relative to the input shaft axis, and rotationally fixed to the input shaft. Further, a plurality of output magnets rotatable about the input shaft axis and in axial alignment with the plurality of input magnets, an output shaft rotationally fixed to the plurality of output magnets, and a housing for fluidically sealing the plurality of output magnets and the output shaft relative to the plurality of input magnets and the input shaft.

The shortcomings of the prior art are overcome and additional advantages are provided through the provision of a method of coupling an input shaft with an output shaft that are fluidically isolated from one another. The method comprising, fluidically sealing an output shaft relative to an input shaft. Further increasing a magnetic coupling force between the input shaft and the output shaft in response to an increase in a rotational speed of the input shaft. This is achieved by decreasing the radial distance between a plurality of input magnets rotationally fixed to the input shaft and a plurality of output magnets rotationally fixed to the output shaft. Additionally this is achieved by moving the plurality of input magnets radially outwardly in response to an increase in centrifugal force acting on the plurality of input magnets resulting from the increase in rotational speed of the input shaft.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

The technical effect of the disclosed embodiments is fluidic isolation of an input shaft to an output shaft while providing torque transmission from the input shaft to the output shaft.

Specifically, the technical effect is to vary the torque transmitted from the input shaft to the output shaft proportional to the rotational speed of the input shaft.

As a result of the summarized invention, a solution has been devised that permits a pump, for example, to be fluidically sealed from a motor that is driving the pump. The invention further permits the motor to start up with substantially no torque resisting rotation of a shaft of the motor. The invention further permits the torque transmitted by the motor to the pump to increase as the rotational speed of the motor increases.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
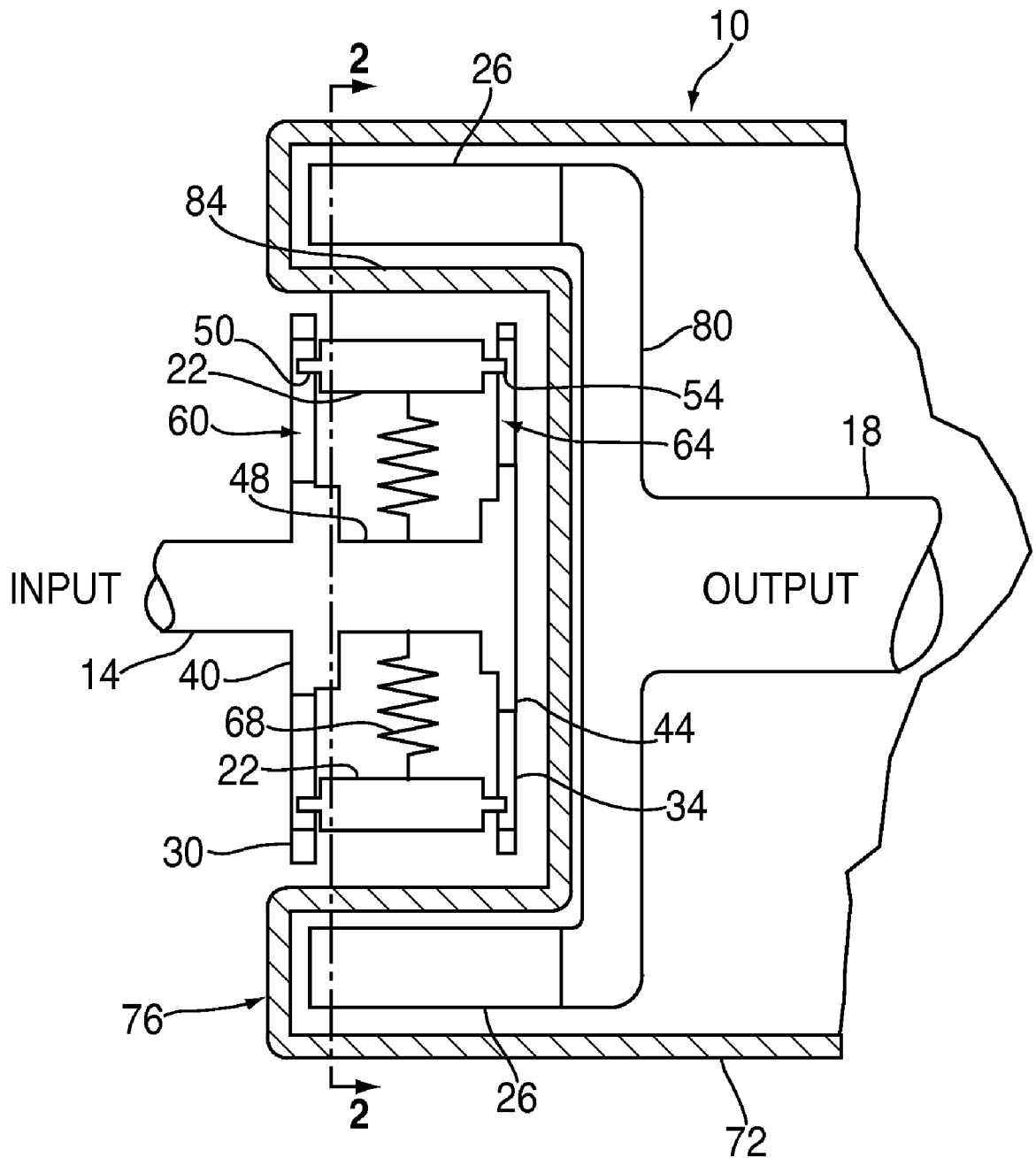
FIG. 1 illustrates a cross sectional view of a magnetic clutch disclosed herein.
Figure 2:
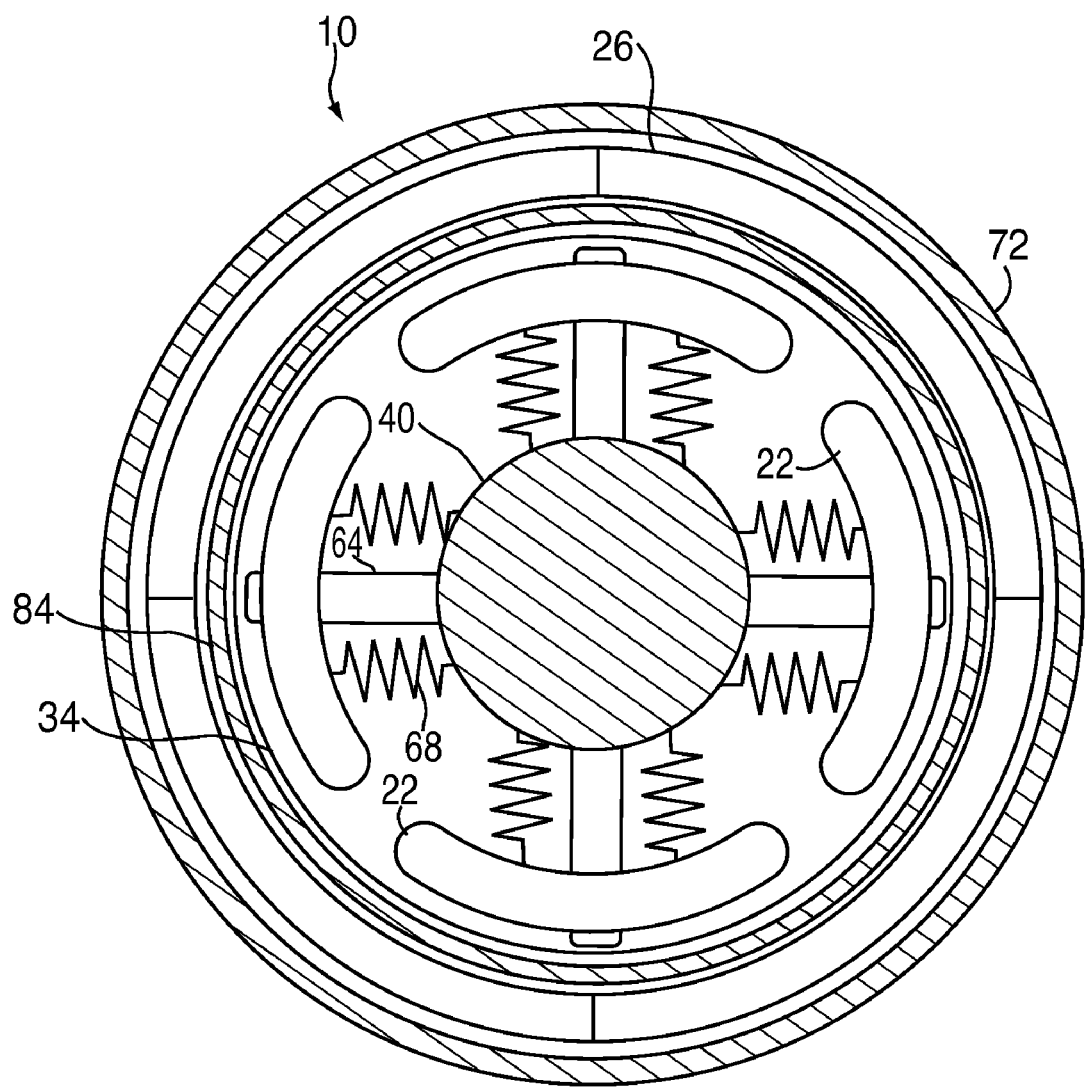
FIG. 2 illustrates a cross sectional view of the magnetic clutch of FIG. 1 taken at arrows 2-2.

Turning now to the drawings in greater detail, FIGS. 1 and 2 depict a centrifugal magnetic clutch generally at 10. The clutch 10 transmits a torque from an input shaft 14, driven by a motor (not shown), to an output shaft 18, which drives a pump (not shown). The torque is transmitted through a coupling of magnetic forces between a plurality of input magnets 22, rotationally fixed to the input shaft 14, and a plurality of output magnets 26, rotationally fixed to the output shaft 18. The strength of the magnetic forces is proportional to a distance separating the input magnets 22 from the output magnets 26. This distance separating the input magnets 22 from the output magnets 26 is variable and control of the separating distance will be described now in greater detail.

The input magnets 22 are radially slidably engaged with a first flange 30 and a second flange 34 that extend radially from a first hub 40 and a second hub 44 respectively. The first hub 40 and the second hub 44 are attached to a third hub 48 that is rotationally fixed to the input shaft 14, thereby rotationally fixing the hubs 40, 44, 48 as well as the flanges 30, 34 to the input shaft 14. Each input magnet 22 has a first tab 50 and a second tab 54 that slidably engage with a first slot 60 and a second slot 64 formed in the first flange 30 and the second flange 34 respectively. The slidable engagement of the tabs 50, 54 with the slots 60, 64 enable the input magnets 22 to slidably move radially inwardly and radially outwardly relative to an axis of the input shaft 14. A plurality of biasing members 68, shown herein as tension springs, create a biasing force on the input magnets 22 thereby urging the input magnets 22 radially inwardly. The input magnets 22 therefore rest with the tabs 50, 54 in contact with the hubs 40, 44 in response to no additional forces acting upon the input magnets 22.

The output magnets 26, output shaft 18 and pump are all housed within a housing 72 that forms a fluidic seal relative to the input shaft 14 and input magnets 22. Stated another way, the output magnets and the output shaft are located on an inside of the housing while the input magnets and the input shaft are located on an outside of the housing. A hollow cylindrical portion 76 of the housing 72 extends axially beyond the output shaft 18 and circumferentially encompasses the hubs 40, 44, 48 and the input magnets 22. The hubs 40, 44 are sized to have radial clearance with the hollow cylindrical portion 76 so that rotation of the hubs 40, 44 is possible without malting contact therewith. Similarly, the input magnets 22 in their radially outward most position do not male contact with the hollow cylindrical portion 76. The output magnets 26 are located within the hollow cylindrical portion 76 of the housing 72 and are able to rotate about an axis of the output shaft 18, and an axis of the input shaft 14, without contacting the housing 72. The output magnets 26 are attached to a bracket 80 that is attached to the output shaft 18 and are cantilevered beyond the bracket 80 and into the hollow cylindrical portion 76 of the housing 72, thereby axially aligning the output magnets 26 with the input magnets 22.

The input magnets 22 and the output magnets 26 are therefore in axial alignment with each other and are separated by a wall 84 of the housing 72. The radial distance separating the input magnets 22 from the output magnets 26 is greatest when the biasing members 68 have urged the input magnets 22 against the hubs 40, 44. This inner most position of the input magnets 22 occurs when the centrifugal force acting on the input magnets 22 is less than the urging force of the biasing member 68. Such a low centrifugal force exists when the input shaft 14 is not rotating or is rotating at slow rotational speeds as occurs during a start up condition. As the rotational speed of the input shaft 14 increases, so do the centrifugal forces acting on the input magnets 22. When the centrifugal forces increase beyond the urging forces of the biasing members 68 the input magnets 22 will begin to move radially outwardly. As the input magnets 22 move outward, they move closer to the output magnets 26, resulting in an increase in the magnetic coupling forces. The increase in magnetic coupling forces causes an increase in the torque transmitted from the input shaft 14 to the output shaft 18. The maximum torque will be transmitted when the input magnets 22 are positioned at the limits of outward travel created by the slots 60 and 64 in which the tabs 50 and 54 of the input magnets 22 ride.

The fact that the minimum torque is transmitted at the slowest speeds of the input shaft 14 is beneficial to systems using a sensorless brushless direct current (SBLDC) electric motor to drive the input shaft 14. SBLDC motors provide very little torque during start up and would have difficulty starting if the clutch were to be transmitting torque between the input shaft 14 and the output shaft 18 during start up.

The aforementioned centrifugal magnetic clutch 10 may serve well in many applications. It would therefore be desirable for the centrifugal magnetic clutch 10 to be customizable so that it may meet the wide range of specific needs that the varied applications will likely have. Several design parameters may be configured to tailor-fit the centrifugal magnetic clutch 10 to the specific task to be performed. For example, the urging force of the biasing members 68 may be set to actuate at the desired rotational speed of the input shaft 14 given the mass of the input magnets 22. Likewise, the minimum distance between the magnets 22, 26 the strength of the magnets 22, 26, the direction of magnetic orientation and the number of magnets 22, 26 utilized may all be configured depending upon the torque required of the specific application.

Embodiments of the invention may include some of the following advantages: transmission of a torque through the wall of a sealed housing, varying torque transmission depending upon rotational speed, start up with substantially zero torque transmission, torque coupling is fully magnetic, no frictional parts to wear out, no frictional wear debris, and simple automatic actuation of torque transfer.

While preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A centrifugal magnetic clutch device, comprising:
an input shaft;
a plurality of input permanent magnets rotatable about an axis of the input shaft, radially movable relative to the input shaft axis, and rotationally fixed to the input shaft;
a plurality of output permanent magnets rotatable about the input shaft axis and axially overlapping the plurality of input permanent magnets such that a radial dimension of an annular gap between the plurality of input permanent magnets and the plurality of output permanent magnets decreases as the plurality of input permanent magnets move radially outwardly;
an output shaft rotationally fixed to the plurality of output permanent magnets; and
a housing with an inside and an outside, the plurality of output permanent magnets and the output shaft being on an inside of the housing and the plurality of input permanent magnets and the input shaft being on the outside of the housing.

2. The centrifugal magnetic clutch device of claim 1, wherein:

the housing fluidically seals the plurality of output permanent magnets and the output shaft from the plurality of input permanent magnets and the input shaft.

3. The centrifugal magnetic clutch device of claim 1, further comprising:

a plurality of biasing members in operable communication with the input permanent magnets for biasing the input permanent magnets radially inwardly.

4. The centrifugal magnetic clutch device of claim 1, wherein:

an increase in a magnetic coupling force occurs between the plurality of input permanent magnets and the plurality of output permanent magnets in response to a radial outward movement of the plurality of input permanent magnets in response to an increase of a centrifugal force applied radially outwardly to the plurality of input permanent magnets in response to a change in a rotational speed of the input shaft.

5. The centrifugal magnetic clutch device of claim 1, wherein:

the input shaft is in operable communication with a sensorless brushless direct current (SBLDC) electric motor.

6. The centrifugal magnetic clutch device of claim 1, further comprising:

a pump that is in operable communication with the output shaft.

7. The centrifugal magnetic clutch device of claim 6, wherein:

the pump is housed within the housing.

8. The centrifugal magnetic clutch device of claim 1, wherein:

the plurality of output permanent magnets perimetrically abut one another.

* * * * *